Fig. 1

July 9, 1946.    W. A. BLACK    2,403,490
REMOTE CONTROL MECHANISM
Filed Feb. 25, 1941    3 Sheets-Sheet 2

INVENTOR.
WILLIAM A. BLACK
BY
ATTORNEY.

Patented July 9, 1946

2,403,490

UNITED STATES PATENT OFFICE 2,403,490

REMOTE CONTROL MECHANISM

William A. Black, Montclair, N. J., assignor, by mesne assignments, to The W. L. Maxson Corporation, New York, N. Y., a corporation of New York Application February 25, 1941, Serial No. 380,475

13 Claims. (Cl. 74—388)

This invention relates to means for remotely controlling power mechanism; i. e., to means capable of causing a controlled member, whose operation may involve the application of a very substantial torque, to conform closely in its operation to the operation of a control member located at a distance. The invention has utility in many fields, notably in the aiming of guns, and in the control of surface craft, aircraft and projectiles from a remote point. For illustrative purposes the invention is disclosed herein in connection with the aiming of a gun.

In the pending applications of William A. Black, for Power amplifiers, Serial No. 284,644, filed July 15, 1939, now Patent No. 2,248,942, and Serial No. 364,809, filed November 8, 1940, now Patent No. 2,331,761, disclosure is made of several forms of power amplifiers, each suitable for utilization in the practicing of the present invention and each comprising a relatively high power, rotary mechanism involving a high torque; variably operated, low power, rotary mechanism, capable of delivering only a relatively low torque, and mechanical means for causing the high power mechanism to respond in its operation substantially to the operation of the low power mechanism. For the purpose of the present disclosure, the illustrative mechanism may be regarded as embodying substantially the simplest of these power amplifiers, to wit, that of Serial No. 284,644. The invention, however, is not confined in its broader aspects to any particular or specific form or type of power amplifier.

If a power amplifier of the kind referred to is to be controlled from a remote point, it is necessary that motion of a member at the remote control station be caused in some way to be reproduced or substantially reproduced by a member which is located at the power amplifier and which forms a part of the low power mechanism thereof.

One of the most practical and advantageous known forms of synchronizer for causing reproduction or substantial reproduction of motion at a distance is the self-synchronous motor. The construction and operation of self-synchronous motors is well known and the motors, themselves, are commercially available, the Bendix motor being known as the "Autosyn" and the General Electric motor as the "Selsyn." For brevity and convenience, and for illustrative purposes, the name "Autosyn" will be used in this specification.

The autosyn comprises a transmitter including a rotor, and a receiver including a rotor. The receiver is electrically controlled from the transmitter to cause the receiver rotor substantially to duplicate every movement of the transmitter rotor. If the transmitter rotor is operated at uniform or variable speed, the receiver rotor is caused to conform closely in its operation to the speed, direction of rotation, and variations of speed of the receiver rotor. If the autosyn operating current is turned on with the transmitter rotor and the receiver rotor out of phase, the latter rotor will shift either forward or backward to a position of substantial coincidence with the transmitter rotor, taking the shortest available path in doing so.

The autosyn has this characteristic, however, that if there is absolutely no lag of the receiver rotor relative to the transmitter rotor, the receiver rotor will be capable of delivering no torque. It is necessary, therefore, that a lag be present in order that the receiver rotor may deliver a small but adequate torque for operating the low power control mechanism of the power amplifier.

The lag which necessarily occurs between the transmitter rotor and the receiver rotor is unavoidably present in some degree as an out-of-phase condition between the primary control member at the control station and the gun or other ultimately operated instrumentality at the receiver station. In the case of a gun, the maximum range of operation is 360°, and the purpose of the entire illustrative mechanism may be considered to be to cause the remotely controlled gun always to point in substantially the same direction (in azimuth) as the primary control member at the control station whenever the remote control means is operative. In other words, phase correspondence of the gun with a primary control member is the thing to be desired.

If the autosyn transmitter rotor were caused to turn in unison with the primary input member, the autosyn receiver rotor would also be caused to turn in unison with the primary input member, subject to the unavoidable autosyn lag, and this turning would be applied through the power amplifier to the gun, still subject to the autosyn lag, and to a further lag introduced by the amplifier. The gun would be out of phase with the primary input member by an amount equal to the lag of the autosyn receiver rotor relative to the autosyn transmitter rotor, plus the lag of the amplifier output shaft relative to the autosyn receiver rotor.

By operating the autosyn transmitter rotor from the primary control member through multiplication gearing, and operating the gun from the amplifier output shaft through appropriate reduction gearing, the out-of-phase condition of the gun with relation to the primary control member can be reduced to a desired fraction of the total out-of-phase condition above referred to, depending upon the step-up and step-down ratio chosen. If, for example, the autosyn transmitter rotor is geared to be turned by the primary control member in the ratio of 36 to 1, and the gun is geared to be turned by the output shaft of the power amplifier at one thirty-sixth the speed of the autosyn transmitter rotor, the out-of-phase condition of the gun with reference to the primary control member will be just one thirty-sixth as great as it would be if no step-up and step-down ratios were employed. This means of minimizing error is desirably utilized in the mechanism disclosed herein, the ratios just referred to being arbitrarily chosen for illustrative purposes.

The multiplication and division of motion, however, introduces a fresh difficulty which it is a salient object of the present invention to overcome. When the autosyn mechanism is cut off from the source of electrical power, the primary control member may be turned freely without influencing the autosyn receiver and the power amplifier, and the gun may be locally operated through the amplifier but independently of the remote control mechanism. Either operation affects the position of the gun relative to the primary control member, and either operation may be of unlimited extent. The departure from correspondence of the primary control member with the gun may be any amount up to a full revolution before substantial phase correspondence is reestablished. One such revolution is equivalent to, and is accompanied by, relative rotation of the autosyn transmitter and receiver rotors amounting to thirty-six revolutions.

If the primary control member and the gun are relatively turned through one or more complete revolutions while the autosyn power is off and the gun remains stationary, the whole number of revolutions may be disregarded as harmless, but any fraction of a revolution that the primary control member and the gun are out of phase when the power is again turned on must be corrected to within a reasonable tolerance. This means that the autosyn transmitter and receiver rotors may have to be relatively rotated through any amount from a small acute angle up to a considerable number of full turns in order to bring about phase correspondence of the gun with the primary control member.

As already noted, it is characteristic of the autosyn that when the power is turned on the receiver rotor will seek phase correspondence with the transmitter rotor by turning through the shortest available path. As soon as correspondence is substantially achieved the receiver will lock in with the transmitter and will thereafter substantially maintain such phase correspondence. The receiver rotor cannot, of course, be more than 180° away in one direction or the other from phase correspondence with the transmitter rotor. This being the case, it is evident that unless some provision is made to the contrary, the autosyn transmitter rotor and the autosyn receiver rotor, upon restoration of autosyn power, will become locked together in corresponding phase for operation in unison when they have turned relatively to one another by an amount not exceeding 180°, or, under the illustrative conditions, not exceeding 5° of rotation of the gun relative to the primary control member. This locking together could occur with the primary control member and the gun in phase with one another, or with them out of phase with one another by any multiple of 10°. A very important object of the present invention is to completely remove this possibility of defective operation.

To this end, in accordance with a practical and advantageous embodiment of the invention, provision is made of two autosyns which will be referred to, respectively, as the coarse autosyn and the fine autosyn. The primary control member is connected to drive the coarse autosyn transmitter rotor in unison with itself, and the fine autosyn transmitter rotor (illustratively) at thirty-six times its own speed. It is the fine autosyn receiver rotor that normally controls the power amplifier, and through the power amplifier produces the operation of the gun in unison with the primary control member at the control station.

It is an important feature of the invention in connection with the preliminary establishment of in-phase conditions, that mechanism is provided, cooperative with and responsive to rotation of the coarse autosyn receiver rotor, for causing the fine autosyn to be disabled as a means for controlling the power amplifier when the gun and the primary control member are out of phase by an amount corresponding to one-half turn or more of the fine autosyn receiver rotor, to assume dominant control of the power amplifier until the gun and the primary control member are out of phase by an amount corresponding to less than one-half turn of the fine autosyn receiver rotor, and for then causing the fine autosyn to be reestablished in its capacity to assert control over the power amplifier. A description and explanation of the control system will be found immediately following the brief description of the drawings and in advance of a more detailed description of the illustrative mechanism.

Other objects and advantages will hereinafter appear.

In the drawings forming part of this specification.

Before going fully into details of construction, it will be useful first to describe and explain in a relatively broad way the general arrangement and the principle of operation of the parts of the control system of the illustrative mechanism. In this outline reference will be had principally to the diagrammatic showing of Figure 4.

Figure 4:
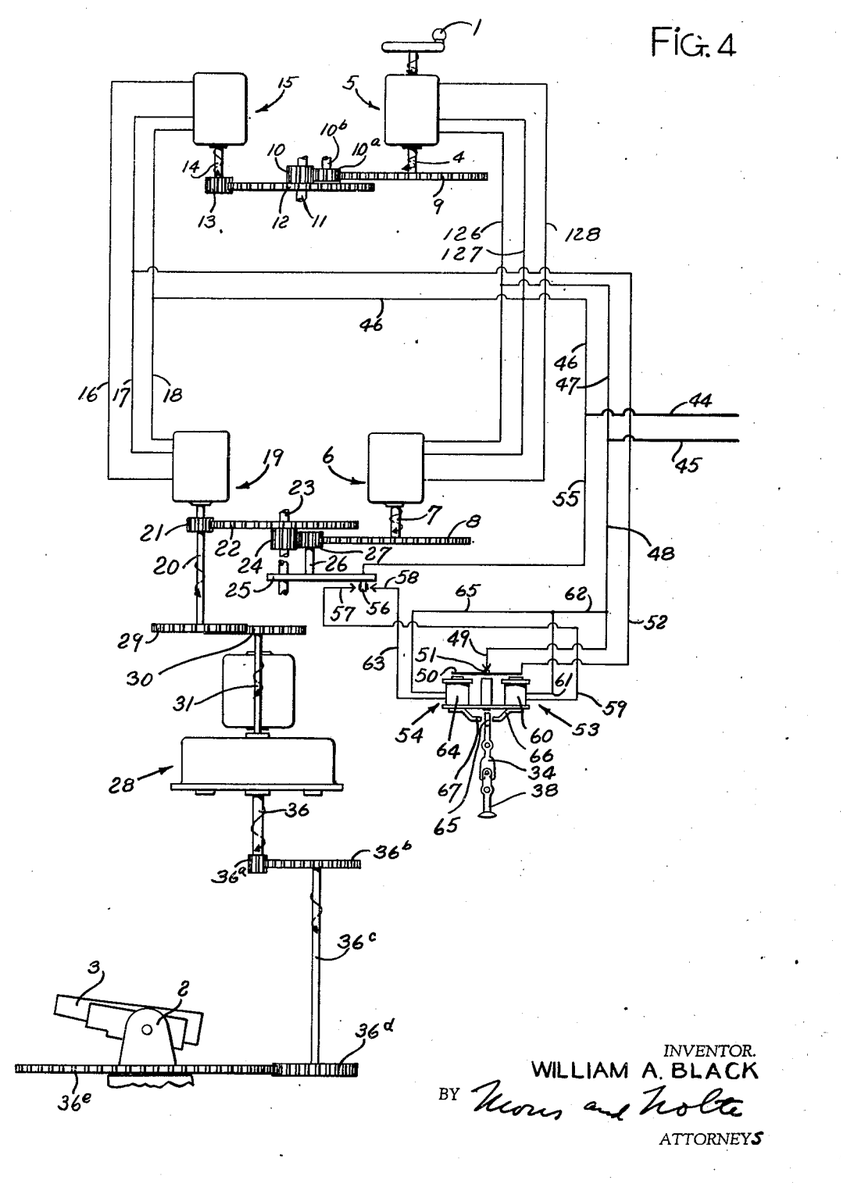
Figure 4 is a diagrammatic view illustrating comprehensively the principle of the remote control mechanism.

A primary control member 1 at the control station is turned with the object in view of turning a distantly located mount 2 of a gun 3 about a vertical axis substantially in unison with the turning of the member 1.

The primary control member 1 is directly connected to the rotor shaft 4 of a coarse autosyn transmitter 5. The coarse autosyn transmitter is connected through two rotor conductors 126 and 127 and through three field conductors represented for simplicity by the single line 128, to a coarse autosyn receiver 6, whose rotor shaft 7 has fast upon it a gear 8.

A gear 9 fast upon the coarse autosyn transmitter rotor 4 drives a pinion 10a which is mounted upon a shaft 10b. The pinion 10a drives a pinion 10 which is mounted upon a shaft 11. The pinion 10 has fast with it a gear 12 which drives a pinion 13 fast upon a rotor shaft 14 of a fine autosyn transmitter 15. The gear ratios from 9 through 13 are such that the rotation of the rotor shaft 14 is in the opposite direction from that of the rotor shaft and is thirty-six times as extensive as that of the rotor shaft 4.

The fine autosyn transmitter is connected through two rotor conductors 17 and 18 and through three field conductors represented for simplicity by the single line 16, with a fine autosyn receiver 19. A rotor shaft 20 of the fine autosyn receiver 19 has fast upon it a pinion 21 which drives a gear 22 mounted on a shaft 23. The gear 22 has fast with it a pinion 24. A switch arm 25 is pivotally mounted upon the shaft 23 and has affixed to it a stub shaft 26 upon which a pinion 27 is rotatably mounted. The pinion 27 is interposed between the pinion 24 driven by the fine autosyn receiver and the gear 8 driven by the coarse autosyn receiver and meshes with both of them, being free to float about an axis coincident with the axis of the pinion 24 but not to leave engagement with the gear 8. The pinions 24 and 27 and the gear 8, therefore, constitute a differential gear of limited output, 24 and 8 being the input gears, and 27 being the output gear. The effective output consists in a rotation of the switch arm 25 in one direction or another about the axis thereof. The purpose of the differential gear and of the switch arm 25 will be explained a little farther on.

The gearing between the coarse and fine autosyn receiver shafts 7 and 20 is chosen to correspond with the gearing between the coarse and fine autosyn transmitter shafts 4 and 14. When the rotor shaft 20 runs in the opposite direction from the shaft 7 and at thirty-six times the rotary speed of the latter shaft, no planetary motion is imparted to the pinion 27 and no motion, therefore, is imparted to the switch arm 25.

In normal operation the fine autosyn rotor shaft 20 is the exclusive driver of the low power control means of a power amplifier 28. A gear 29 fast on the shaft 20 drives a gear 30 of the same size as itself, fast on the low power control shaft 31 of the amplifier. The shaft 31 is driven in the direction in which the primary input member 1 turns.

The shaft 31 has fast upon it a gear 32 which meshes with a floating pinion 33 (see particularly Figures 1 and 2) carried by a lever 34. The lever 34 is mounted for rocking movement about the axis of the shaft 31. A gear 35 of the same size as the gear 32 is fast upon an output shaft 36 of the power amplifier 28. This gear is also in mesh with the pinion 33. The gears 32 and 35 and the pinion 33 constitute a differential gear, the gears 32 and 35 being the input gears, and the pinion 33 being the output gear. Output of the differential gear is represented by planetary movement of the pinion 33, i. e., rocking movement of the lever 34. When the gears 32 and 35 are running in the same direction and at equal speeds, there is no planetary movement imparted to the pinion 33, and the lever 34 remains stationary.

The lever 34 has a forked lower end which embraces a pin 37 affixed to the tail of a rocking valve 38. The valve 38 is affixed to a shaft 39 which is mounted in axial alignment with the amplifier output shaft 36. The valve 38 inversely controls outlets 40 and 41 of hydraulic gear pumps 42 and 43, and thereby controls the speed and direction of rotation of shaft 36 in the manner and for the purpose fully described and explained in Serial No. 284,644. A concise detailed description of the amplifier structure will be included hereinafter. For the present it is sufficient to note that swinging of the valve 38 in a clockwise direction from the neutral position produces rotation of the shaft 36 in a counter-clockwise direction, and swinging of the valve 38 in a counter-clockwise direction from the neutral position produces rotation of the shaft 36 in a clockwise direction. This is true whether the mechanism be viewed from the front as in Figure 3 or from the rear as in Figure 2.

The shaft 36 has fast upon it a gear 36a which drives a gear 36b, fast on a shaft 36c. A gear 36d fast on the shaft 36c drives a gear 36e, the latter gear being connected to turn the gun mount 2 in unison with itself. The described train normally drives the gun mount 2 in the same direction and at the same speed as the primary control member 1.

As has already been indicated in the introductory portion of this specification, the purpose of providing the coarse autosyn is to enable in-phase conditions to be automatically and dependably reestablished between the primary input member 1 and the gun mount 2 when an out-of-phase condition has been set up with the autosyn current cut off, which requires for its correction a relative rotation of the rotors of the fine autosyn transmitter, and the fine autosyn receiver of 180° or more.

Alternating line current is supplied to the autosyns through a pair of line conductors 44 and 45 (see Figure 4). The conductor 44 is directly and constantly connected to conductor 127 of the coarse autosyn through a conductor 46. The conductor 45 is directly and constantly connected to conductor 126 of the coarse autosyn through a conductor 47. Whenever the line current is on, therefore, the operating circuit of the coarse autosyn is complete and the coarse autosyn is energized and fully operative.

The conductor 46 is also extended across and permanently connected to the conductor 18 of the fine autosyn, thereby connecting the conductor 18 with the conductor 44. The operativeness of the fine autosyn is dependent upon the establishment of a connection between the conductor 17 of the fine autosyn and the line conductor 45, and the establishment of such a connection is, in turn, made dependent upon operating conditions of the mechanism.

A conductor 48 runs from conductor 45 to a switch contact 49. An electromagnet armature 50 carries a contact 51 for cooperation with the contact 49, the contact 51 being connected through a conductor 52 to the conductor 17 of the fine autosyn. The contacts 49 and 51 normally engage one another and cause the fine autosyn to be energized when the line current is on. Such engagement is broken, however, when the armature 50 is drawn downward. The armature 50 is so mounted and arranged that it may be drawn downward to break the fine autosyn circuit by the energization of either of two electromagnets 53 and 54.

Energization of the electromagnets 53 and 54 is selectively controlled through the switch arm 25. The conductor 44 is connected through a conductor 55 with a contact 56 carried by the switch arm 25. The contact 56 normally stands in a neutral position between the contacts 57 and 58, and neither of the electromagnets 53, 54 is energized. When the contact 56 engages contact 57 it becomes connected with the conductor 45 through conductor 59, winding 60 of electromagnet 63, and conductors 61, 62 and 48. When the contact 56 engages the contact 58, it becomes connected with the conductor 45 through conductor 63, winding 64 of electromagnet 54, and conductors 65, 62 and 48.

The valve 38 is made directly responsive to the electromagnets 53 and 54. The tail portion 65 of lever 34 (see Figures 1, 2 and 4) constitutes an electromagnet armature which stands between pole pieces 66 and 67 of the respective electromagnets 53 and 54. As viewed in Figure 4, energization of the electromagnet 53 causes the lever 34 to be swung in a clockwise direction, and this causes the valve 38 to be swung in a counter-clockwise direction causing the output shaft 36 of the amplifier to be driven in a clockwise direction. When the electromagnet 54 is energized, the lever 34 is swung in a counter-clockwise direction, and this causes the valve 38 to be swung in a clockwise direction and the output shaft 36 of the amplifier to be driven in a counter-clockwise direction.

The electromagnets 53 and 54 are never energized, of course, unless the pinion 27 is swung to one side or the other of its neutral position far enough to cause the contact 56 to engage the contact 57, or to cause the contact 56 to engage the contact 58. If the parts were set with the pinion 27 in its intermediate or neutral position and the shaft 7 were held stationary, turning of the shaft 20 would carry the contact 56 into engagement with the contact 57 or the contact 58, depending upon the direction of rotation of the shaft 20 before the shaft 20 had been turned through as much as 180°. Such engagement would not be established, however, by any lack of synchronism which occurs between the shafts 7 and 20 during normal operation, that is, during operation which is occasioned by the turning of the primary input member 1 with the various parts in their normal or substantially in-phase condition.

It may be assumed initially that the line current has been cut off and that the gun mount 2 is displaced in a clockwise direction relative to the primary control member 1 by a considerable amount, say somewhere between 30° and 35°. This entails a clockwise displacement of the coarse autosyn receiver rotor relative to the coarse autosyn transmitter rotor of between 30° and 35°, and a counter-clockwise displacement of the fine autosyn receiver rotor relative to the fine autosyn transmitter rotor of between three and three and a half complete turns. It may be assumed also for simplifying the present explanation that the primary control member 1 is not being turned when the line current is restored, although this latter condition is not a requisite of correct operation.

At the instant of restoration of the line current the contacts 49 and 51 are engaged, and hence the fine autosyn as well as the coarse autosyn becomes energized. The tendency of the fine autosyn receiver is to shift clockwise toward a position of phase correspondence with the fine autosyn transmitter, and the tendency of the coarse autosyn receiver is to shift counter-clockwise toward a position of phase correspondence with the coarse autosyn transmitter. Under the illustrative conditions assumed the shaft 20 would be turning the pinion 27 clockwise. At the same time the shaft 7 would be turning the pinion 27 clockwise.

Figure 3:
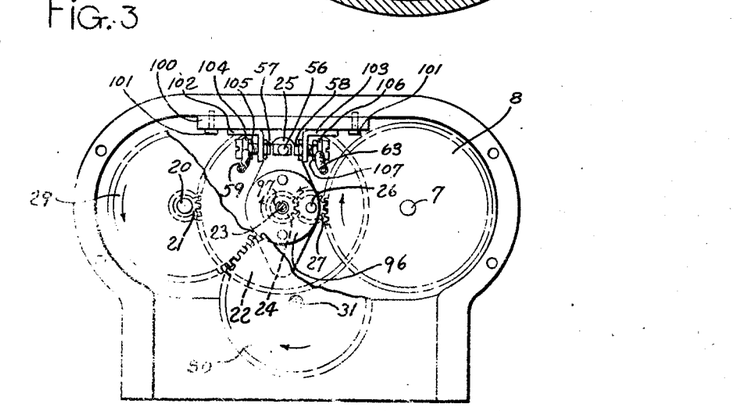
Figure 3 is a detail sectional view taken upon the line 3—3 of Figure 1, looking in the direction of the arrows.

In order for the pinion 27 not to be moved downward, as viewed in Figure 3, it would be necessary for the shaft 20 to gain speed thirty-six times as fast as the shaft 7. The autosyn receivers 6 and 19 are capable of delivering substantially the same torque, however, and would not gain speed at widely different rates. The effect of the rotation of shaft 20 at this time would be almost negligible, and the pinion 27 would be shifted downward almost as fast as if the pinion 24 were standing still. The pinion 27, therefore, is carried downward quickly until the downward motion is arrested by engagement of the contact 56 with the contact 58. As soon as this engagement is established the electromagnet 54 is energized, and this breaks engagement between the contacts 49 and 51 and renders the fine autosyn transmitter 15 incapable of influencing the fine autosyn receiver 19.

At the same time the energization of the electromagnet 54 immediately causes the lever 34 to swing the valve 38 in a clockwise direction, and this causes the output shaft 36 and the control shaft 31 of the amplifier 28 to be driven by the power operating means of the amplifier in a counter-clockwise direction. The fine autosyn is held disabled until the shaft 7 is out of phase with the shaft 4 by an amount less than 5°. At a point within 5° of exact phase correspondence of the shafts 4 and 7, the torque output of the shaft 7 diminishes, the pinion 27 returns toward neutral position, the energizing circuit of electromagnet 54 is broken, and the energization of the fine autosyn circuit is reestablished, so that the fine autosyn is now able to take over control. The complete operation of the parts will be more fully explained presently.

Had the out-of-phase condition of the gun mount 2 with relation to the primary control member 1 been such as to cause the shaft 7, upon reestablishment of line power, to turn in a clockwise direction, the pinion 27 would have been shifted upward and the contact 56 would have been carried into engagement with the contact 57, causing the electromagnet 53 to be energized. In this case also the energizing current for the fine autosyn would have been cut off, but contrary to the former case the lever 34 would have been caused to swing the valve 38 counter-clockwise and would have caused the output shaft 36 of the power amplifier to be driven in a clockwise direction by the high power input shaft 68 of the amplifier. Again the fine autosyn would be reestablished as the control means for the power amplifier at a point within 5° of exact phase correspondence of the shafts 4 and 7.

The gearing between the shafts 7 and 20 constitutes both a switch operating differential and a lost motion driving means. As soon as the switch arm 25 is arrested at one of its limits of motion upon the turning on of the line current, the outlet for the autosyn differential is closed. The floating pinion 27, therefore, loses its character as a differential gear outlet and seeks positively to transmit motion of the coarse autosyn receiver shaft 7 to the now electrically disabled autosyn receiver shaft 20 at thirty-six times the rotary speed of the shaft 7 and in a direction opposite to the rotation of the shaft 7. This is consistent with the floating pinion 27 of the autosyn differential gear maintaining the limit position to which it has been moved.

The tendency of the coarse autosyn receiver rotor (with no other load than the shaft 7 and the gear 8) is to turn at a speed more than one thirty-sixth of the maximum speed at which the power amplifier can drive the power amplifier output shaft 36 (such maximum speed being a function of the constant speed of the high torque input shaft 68 of the amplifier and of the limit position of the lever 34).

The floating pinion 33, carried by the valve operating lever 34, is at a limit of movement, and has temporarily lost its character as a differential outlet and become a positive transmitter of motion between the gears 35 and 32. The shaft 31 is, therefore, restrained from turning faster than the shaft 36. The shaft 20 is correspondingly held down in its speed, and since the arresting of pinion 27 in a limit position has established a positive gear train between 7 and 20, the speed of 7 is restrained from shaft 36 and forced to be consistent with the speed of shaft 36. Rotation of the gun mount 2 is, therefore, consistent in direction and speed of rotation with the direction and speed of rotation of shaft 7.

The fact that the electromagnets 53 and 54 act directly upon the valve operating lever 34 is important from the standpoint of applying and maintaining an adequate operating force upon the valve 38. The shaft 7 has no difficulty in keeping up to one thirty-sixth of the maximum speed of the shaft 36, but under the illustrative conditions it delivers too little torque to the shaft 31 to warrant direct use of the coarse autosyn for operating the valve.

When the coarse autosyn receiver shaft 7 is nearly in phase with the coarse autosyn transmitter shaft 4 (in no event more than 5° out of phase) the coarse autosyn transmitter ceases to apply a sufficient driving power to the coarse autosyn receiver shaft 7 to maintain the conditions just described. Since the rotary motion of the power amplifier output shaft 36 and of the fine autosyn receiver shaft 20 will be continued unabated so long as the floating pinion 27 of the autosyn differential maintains its extreme, switch closing (fine autosyn disabling) position, any diminution of speed of the coarse autosyn receiver shaft 7 will immediately cause the switch controlled by the floating pinion 27 of the autosyn differential to be opened. This open-circuits the previously energized electromagnet (53 or 54) simultaneously causing the fine autosyn to be energized, and the valve 38 to be released by the electromagnet to the control of the fine autosyn.

The fine autosyn now takes over control to improve the phase correspondence of the gun mount 2 with the primary control member 1, while the coarse autosyn receiver rotor comes to rest. When the fine autosyn receiver rotor has attained substantial coincidence with the fine autosyn transmitter rotor, the fine autosyn transmitter ceases to apply a driving torque to the fine autosyn receiver rotor and that rotor comes to rest, with the consequence that the output shaft 36 of the amplifier and the gun mount 2 also come to rest.

The gun mount 2 has now been brought substantially into phase with the primary control member 1. The primary control member 1 may now be turned to effect simultaneously a corresponding turning of the gun through the operation of the fine autosyn and the power amplifier 28. The coarse autosyn operates idly during such normal control of the gun mount from the primary control member. The coarse autosyn receiver rotor continues out of phase with the primary control member 1 by an amount substantially thirty-six times as great as the difference of phase of the primary control member 1 and the gun mount 2, but never enough to cause the contact 56 to engage either the contact 57 or the contact 58.

In the illustrative mechanism certain gear ratios and relative directions of rotation have been chosen and referred to, to facilitate the description and to promote a ready understanding of the principle of the invention. It will be evident, of course, that the carrying out of the principle of the invention admits of almost limitless variation of detail so long as all the parts are harmoniously organized to achieve end results of the kind described.

The two-stage control principle, coarse and fine, could be extended to a through stage control, coarse, intermediate, and fine, or even to four or more stages if required. For practical purposes the two-stage control has been found adequate. A plural stage power amplifier may also be utilized to advantage. In such a case the remote control means would be connected and coordinated with the first amplifier stage.

The power amplifier 28 and the control means therefor at the receiver station are all combined into a single compact unit.

Figure 1:
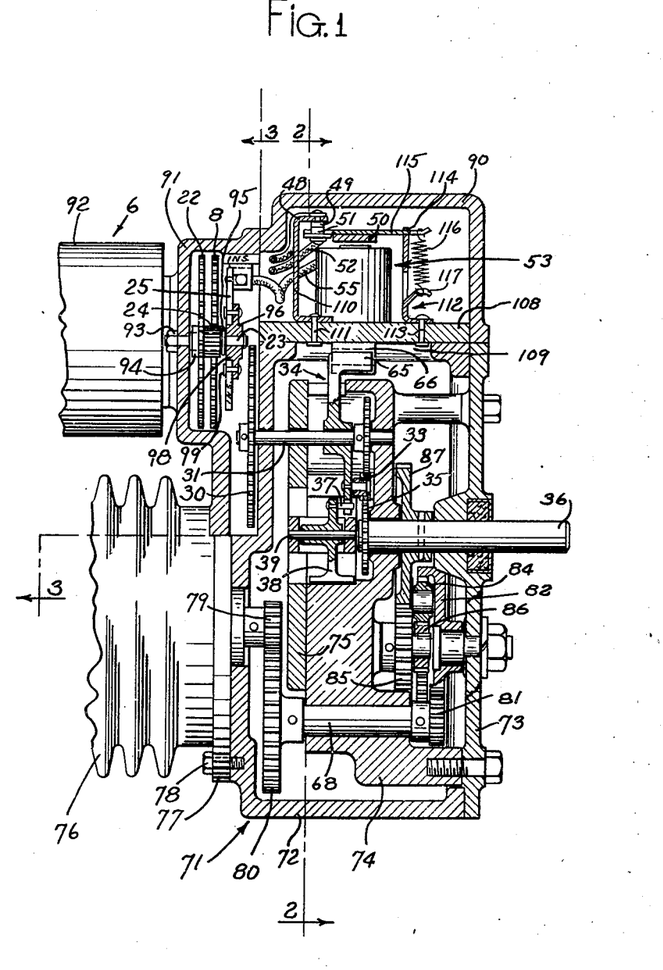
Figure 1 is a fragmentary view in side elevation, partly broken away, of a power amplifier in association with autosyn controlling mechanism.

The power amplifier 28 is enclosed in a housing 71 comprising a rear hollow shell 72 and a front closure plate 73 secured thereto. The housing 71 is substantially filled with oil so that all of the running parts disposed within the casing are constantly submerged. A block 74 having various bores and cavities in it is attached to the front cover plate and has affixed to its rear face a closure plate 75. The block 74 and the closure plate 75 define the chambers of gear pumps 42 and 43, the exit passages 40 and 41 from the gear pump chambers, operating space for certain of the gearing, and bearings for a number of the shafts.

A motor housing 76 is affixed through a flange 77 by means of screws 78 to the rear face of the casing member 72. The motor housing is sealed against ingress of oil from the casing 71. The forward end of the motor shaft (not shown) has affixed to it a driving pinion 79 which drives a gear 80 fast on the high torque input shaft 68 of the amplifier 28. The high torque input shaft 68 of the amplifier 28 is rotated continuously and at constant speed, and is connected through two opposed hydraulic slip drive trains to the high torque output shaft 36 in such a manner as to apply an extraneously imposed direction and speed of rotation to the high torque output shaft 36. The shaft 68 has fast upon it a pinion 81 which drives an input gear 82 of one of the opposed trains in one direction and at a fixed speed, and the gear 82 in turn drives a like input gear 83 of the other of the opposed trains in the opposite direction and at the same speed. The opposed trains are duplicates of one another. A brief description of one of the trains will, therefore, suffice for both.

The gear 82 is formed with internal as well as external teeth, so that it may constitute a ring gear element of a differential gear. The gear 82, which constitutes the input of the differential gear, meshes with planet gears 84 carried by an output gear 85. The planet gears 84 also mesh with a sun gear 86 which is the driver for the gear pump 42.

The output gears 85 of the two trains are both in mesh with a gear 87 fast upon the high torque output shaft 36. The high torque input shaft 68 serves to drive the input gears 82 and 83 at equal speeds but in opposite directions, but the output gears 85 of the two trains are always constrained when not at rest to rotate at equal speeds and in the same direction with one another because of their common engagement with the gear 87. Because of this opposed relation of the two trains, no motion is imparted to the output shaft 36 so long as the resistances to operation of the sun gear outputs of the two trains are equal. Unbalancing of these resistances, however, causes motion to be transmitted to the high torque output shaft 36 in one direction or the other according to the direction of unbalance.

Figure 2:
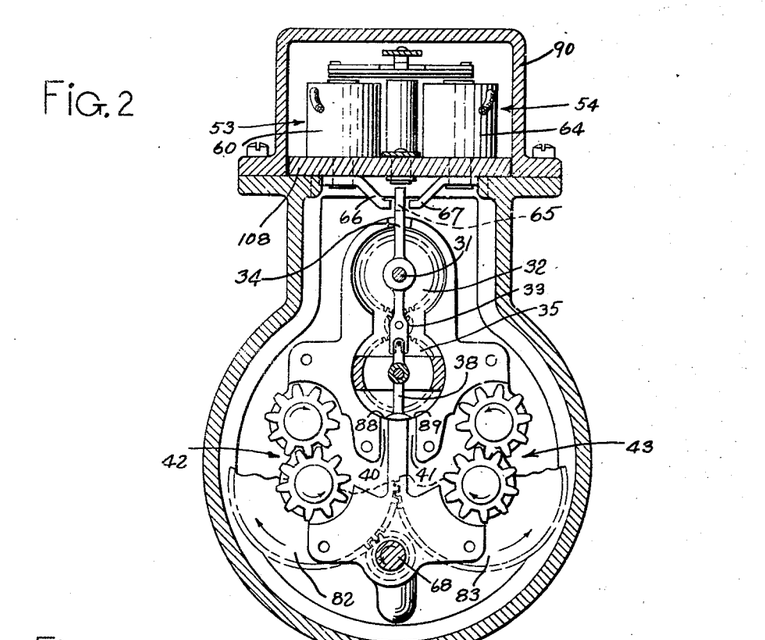
Figure 2 is a transverse sectional view in elevation of a portion of the mechanism illustrated in Figure 1, the section being taken on the line 2—2 of Figure 1 looking in the direction of the arrows.

The gear pump outlet passages 40 and 41 terminate, respectively, in outlet ports 88 and 89, as seen in Figure 2. The valve 38, which is a segmental valve, affixed to the shaft 39, is adapted to be shifted in one direction or another from a neutral position for controlling the pump outlet ports 88 and 89 inversely. The pump obstructing valve 38, when in a neutral or central position, partially obstructs each of the outlet ports 88 and 89, the degrees of obstruction being equal. The valve 38 may, however, be moved clockwise (as viewed in Figure 2) to increase the obstruction of the outlet port 88 while diminishing the obstruction of the outlet port 89, or it may be moved in the opposite direction to increase the obstruction of the outlet port 89, while diminishing the obstruction of the outlet port 88. It is evident, of course, that the power required for thus operating the valve is but a small fraction of the power which the shaft 68 can be caused to deliver to shaft 36 as a result of such valve operation. As already explained, the valve 38 is normally under the joint control of gears 32 and 35 affixed, respectively, to the low power control shaft 31 and to the high torque output shaft 36.

The valve 38 is also subject to electromagnetic control through the armature lever 34. The electromagnets and associated conductors and switches are desirably protected against exposure to the oil in the housing 71. These parts, together with the autosyn differential gears are housed in auxiliary casing members 90 and 91 which are affixed to the housing 71 externally thereof.

The autosyn receivers are individually mounted in their own casings, the casing 92 of the autosyn 6 being fragmentarily illustrated in Figure 1. These autosyn casings are affixed to the rear face of the casing member 91. The rotor shaft 7 of the autosyn 6 extends forward into the casing member 91 and has the gear 8 affixed to its forward end and disposed within the casing member 91. Similarly, the rotor shaft 20 of the autosyn 19 extends forward into the casing member 91, and the pinion 21 and the gear 29 which are affixed to this shaft are disposed within the casing member 91.

The shaft 23 upon which the gear 22, the pinion 24 and the switch arm 25 are rotatably mounted, is a shoulder stud, and is supported from the rear wall of the casing member 91, being clamped to the wall by a nut 93 which is screwed onto a reduced, threaded, rear end portion of the shaft. The gear 22 and the pinion 24 are fast with one another, the gear 22 being formed with a boss or hub portion 94 which bears against the inner face of the casing member 91. A spacing collar 95, integral with the shaft 23, is interposed between the forward side of the pinion 24 and a disc 96, the disc being rotatably mounted on the forward end of the shaft 23. A snap ring retainer 97 is affixed to the forward extremity of the shaft 23 for holding the disc 96 on the shaft.

The disc 96 is formed with a rearwardly extending cylindrical boss 98, and the switch arm 25 is impaled upon the boss, being formed to fit the boss. The switch arm 25 is affixed to marginal portions of the disc 96 by means of rivets 99. The switch arm 25 is made of insulating material, and has the contact member 56 affixed to its upper end. As already noted, the conductor 55 is connected to the contact member 56.

The casing member 91 has an insulating block 100 secured to lie against the under face of its top wall by means of screws 101 passed through the insulating block and threaded into the top wall. The block 100 is desirably of laminated construction. Metallic brackets 102 and 103, which are L-shaped, have horizontal arms which are attached to the block 100 and vertical arms which extend downward from the block 100 in confronting relation to one another.

The contacts 57 and 58 take the form of headed screws which are threaded through the vertically extending arms of the brackets 102 and 103, respectively. A terminal ring 104 of the conductor 59 is clamped against the head of the screw 57 by means of a nut 105 threaded on the screw. Similarly, a terminal ring 106 of the conductor 63 is clamped against the head of the screw 58 by means of a nut 107 threaded on the screw. The screws are adjusted relative to one another and to the neutral position of the contact 56 to afford to the contact 56 and the switch arm 25 the range of movement desired for causing the switch arm and the autosyn differential to operate in the manner heretofore described and in accordance with the principle heretofore explained.

A plate 108 of non-magnetic and non-conductive material is secured to the top of the casing member 72 and covers an opening 109 formed in the top of the casing member. The electromagnet pole pieces 66 and 67 extend down through the plate 108, fit the plate snugly, and are sealed to preclude the splashing or seepage of oil upward into the chamber in which the electromagnets 53 and 54 are housed. The windings 60 and 64 of the electromagnets 53 and 54 are mounted upon the plate 108. A C-shaped bracket 110 affixed to the plate 108 by rivets 111 extends upward between the electromagnets and to the rear thereof, and has its upper end portion extended forward to support the contact 49. As previously noted, the conductor 48 is affixed to the contact 49.

A bracket 112 is affixed to the plate 108 between the electromagnets and in front of them by rivets 113. The bracket 112 is formed at the upper end thereof with a rectangular recess 114 through which the forward end portion of a bail or rocking lever 115 extends with capacity to rock upon that portion of the bracket which forms the base of the slot. The bail is formed with notches which loosely embrace the bracket 112 at opposite ends of the recess 114. The lever 115 extends rearward from the bracket and has affixed to it the armature member 50 which is adapted to be drawn downward by energization of either the magnet 53 or the magnet 54. The lever 115 has affixed to the rear end portion thereof the contact 51 which is adapted to engage the contact 49 in the raised position of the lever as illustrated in Figure 1 and to disengage the contact 49 when the lever is drawn downward through the energization of either one of the electromagnets. As already noted, the conductor 52 is connected to the contact 51.

The lever 115 has a tail portion at its forward end which extends forward from the bracket 112. A coil spring 116 is connected to this portion of the lever and to an arm 117 of the bracket 112. The spring 116 tends constantly to draw the forward end of the lever downward and hence to hold the contact 51 upward and in engagement with the contact 49. Unless one or the other of the electromagnets 53 and 54 is energized, therefore, the contact 51 will always be in engagement with the contact 49.

While the pole pieces 66 and 67 of the electromagnets for acting upon the armature member 65 extend down into the oil filled housing 71, it is to be noted that these members are designed to exert exclusively an electromagnetic action, and that they do not constitute electrical contact members for the conducting of electrical currents. They are not themselves submerged in oil, but stand above the level of the oil in the housing 71. There is no serious objection to their surfaces becoming oil coated, since the oil does not detrimentally affect the magnetic properties of the members nor interfere with their intended magnetic action.

I have described what I believe to be the best embodiments of my invention. I do not wish, however, to be confined to the embodiments shown, but what I desire to cover by Letters Patent is set forth in the appended claims.

I claim:

1. In a remote control mechanism which includes a primary control member at a transmitting or control station and a controlled member at a receiving station which is required, when under the influence of the remote control mechanism, to be maintained in phase with the primary control member subject to fine tolerances of error, in combination, a pair of synchronizers each comprising rotors at the transmitting and receiving stations, respectively, and means for causing the receiving rotor of each synchronizer to seek and maintain phase correspondence with the transmitting rotor of the same synchronizer, subject to a lag of limited extent, means for driving the transmitting rotors from the primary control member at speeds bearing a fixed relation to one another, the rotor of the fine synchronizer at a speed considerably in excess of the speed of the rotor of the coarse synchronizer, means for normally operating the controlled member at the receiving station under the control of the fine synchronizer, and means responsive to an out of phase condition of the controlled member and the primary control member corresponding to more than one-half turn of the transmitting and receiving rotors of the fine synchronizer relative to one another, to cause the fine synchronizer to be temporarily disabled and superseded in its controlling function by the coarse synchronizer and then to be reestablished in its controlling function when the coarse synchronizer has reestablished synchronism of the controlled member relative to the primary control member within a limit corresponding to less than a half turn of the fine synchronizer rotors relative to one another.

2. In a remote control mechanism which includes a primary control member at a transmitting or control station and a controlled member at a receiving station which is required, when under the influence of the remote control mechanism, to be maintained in phase with the primary control member subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for controlling the coarse and fine transmitter rotors from the primary control member, the former at the speed of the primary control member and the latter at a fixed multiple of that speed, means driven by the receiver rotor of the fine synchronizer for controlling operation of the controlled member, differential means driven jointly by the two receiver rotors, and means responsive to said differential means for temporarily rendering the fine receiver rotor non-responsive to the fine transmitter rotor whenever the remote control mechanism is set into operation with said rotors out of phase by more than a predetermined amount.

3. In a remote control mechanism which includes a primary control member at a transmitting or control station and a controlled member at a receiving station which is required, when under the influence of the remote control mechanism, to be maintained in phase with the primary control member subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, means driven by the receiver rotor of the fine synchronizer for controlling the operation of the controlled member, differential means driven jointly by the two receiver rotors, means responsive to said differential means for temporarily rendering the fine receiver rotor non-responsive to the fine transmitter rotor whenever the control mechanism is set into operation with said rotors out of phase with one another by more than a predetermined amount, and means responsive to said differential means for causing the coarse synchronizer to assert a superseding control over the operation of the controlled member and of the fine receiver rotor until the controlled member is out of phase with the primary control member by an amount corresponding to less than a half turn of the fine receiver rotor relative to the fine transmitter rotor.

4. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for driving the coarse and fine transmitter rotors from the primary control member at speeds which bear a fixed relationship, the latter at a speed considerably in excess of the former, means driven by the receiver rotor of the fine synchronizer for controlling the operation of the controlled member, a lost motion connecting means between the fine and coarse receiving rotors permitting relative rotation of the fine synchronizer receiver rotor and the coarse synchronizer receiver rotor in either direction from a neutral or midway condition of said lost motion means limited in extent to an amount corresponding to less than a half turn of the fine receiver rotor, said lost motion means at either limit establishing a drive from the coarse receiver rotor to the fine receiver rotor of the same ratio as that which is maintained between the transmitting rotors of the synchronizers, and means responsive to said lost motion means when the lost motion has been exhausted in either direction for rendering the fine synchronizer receiver rotor non-responsive to the fine synchronizer transmitter rotor.

5. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for driving the coarse and fine transmitter rotors from the primary control member at speeds which bear a fixed relationship, the latter at a speed considerably in excess of the former, means driven by the receiver rotor of the fine synchronizer for controlling the operation of the controlled member, a lost motion connecting means between the fine and coarse receiving rotors permitting relative rotation of the fine synchronizer receiver rotor and the coarse synchronizer receiver rotor in either direction from a neutral or midway condition of said lost motion means limited in extent to an amount corresponding to less than a half turn of the fine receiver rotor, said lost motion means at either limit establishing a drive from the coarse receiver rotor to the fine receiver rotor of the same ratio as that which is maintained between the transmitting rotors of the synchronizers, means responsive to said lost motion means when the lost motion has been exhausted in either direction for rendering the fine synchronizer receiver rotor non-responsive to the fine synchronizer transmitter rotor, and means also directly responsive to said lost motion means for causing the controlled member to be turned until it is out of phase with the primary control member by an amount corresponding to less than a half turn of the fine receiver rotor relative to the fine transmitter rotor.

6. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and electrical means for causing the receiver rotor to correspond in phase with the transmitter rotor subject to a lag of limited extent, a fine synchronizer comprising a transmitter rotor at the control station, a receiver rotor at the receiving station, and electrical means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, means driven by the receiver rotor of the fine synchronizer for controlling the operation of the controlled member, means for connecting the synchronizers to a source of electrical energy, lost motion connecting means between the fine and coarse receiver rotors permitting relative rotation of the fine synchronizer receiver rotor and the coarse synchronizer receiver rotor in either direction from a neutral or midway condition of the lost motion means limited in extent to an amount corresponding to less than a half turn of the fine receiver rotor, said lost motion means at either limit establishing a positive drive in one direction of rotation between the coarse and fine receiver rotors of the same ratio as that which is maintained between the transmitting rotors of the synchronizers, and switch means responsive to said lost motion means when the lost motion has been exhausted in either direction for rendering the fine receiver rotor non-responsive to the fine transmitter rotor until the controlled member is out of phase with the primary control member by an amount corresponding to less than a half turn of the fine receiver rotor relative to the fine transmitter rotor.

7. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and electrical means for causing the receiver rotor to correspond in phase with the transmitter rotor subject to a lag of limited extent, a fine synchronizer comprising a transmitter rotor at the control station, a receiver rotor at the receiving station, and electrical means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, means driven by the receiver rotor of the fine synchronizer for controlling the operation of the controlled member, means for connecting the synchronizers to a source of electrical energy, lost motion connecting means between the fine and coarse receiver rotors permitting relative rotation of the fine synchronizer receiver rotor and the coarse synchronizer receiver rotor in either direction from a neutral or midway condition of the lost motion means limited in extent to an amount corresponding to less than a half turn of the fine receiver rotor, said lost motion means at either limit establishing a positive drive in one direction of rotation between the coarse and fine receiver rotors of the same ratio as that which is maintained between the transmitting rotors of the synchronizers, switch means operated by said lost motion means and made effective thereby when the lost motion has been exhausted in either direction, and electromagnetic means controlled by said switch means for rendering the fine receiver rotor non-responsive to the fine transmitter rotor until the controlled member is out of phase with the primary control member by an amount corresponding to less than a half turn of the fine receiver rotor relative to the fine transmitter rotor.

8. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and electrical means for causing the receiver rotor to correspond in phase with the transmitter rotor subject to a lag of limited extent, a fine synchronizer comprising a transmitter rotor at the control station, a receiver rotor at the receiving station, and electrical means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, means driven by the receiver rotor of the fine synchronizer for controlling the operation of the controlled member, means for connecting the synchronizers to a source of electrical energy, lost motion connecting means between the fine and coarse receiver rotors permitting relative rotation of the fine synchronizer receiver rotor and the coarse synchronizer receiver rotor in either direction from a neutral or midway condition of the lost motion means limited in extent to an amount corresponding to less than a half turn of the fine receiver rotor, said lost motion means at either limit establishing a positive drive in one direction of rotation between the coarse and fine receiver rotors of the same ratio as that which is maintained between the transmitting rotors of the synchronizers, a switch member operated by said lost motion means, a pair of electromagnets, a pair of circuits including the respective electromagnets and adapted to be selectively closed by the switch means in accordance with the direction in which the switch means is moved by the lost motion means, means responsive to energization of either of the electromagnets for rendering the fine receiver rotor non-responsive to the fine transmitter rotor, and means selectively responsive to the electromagnets for establishing and maintaining rotation of the controlled member in one direction or the other according to the electromagnet which is energized until the controlled member is out of phase with the primary member by an amount corresponding to less than a half turn of the fine receiver rotor relative to the fine transmitter rotor.

9. In a remote control mechanism which includes a primary control member at a transmitting or control station and a controlled member at a receiving station which is required, when under the influence of the remote control mechanism, to be maintained in phase with the primary control member subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, a power amplifier at the receiving station comprising opposed hydraulic slip drives, a valve for inversely controlling the positiveness of said drives, a low power control shaft, and a high torque output shaft for driving the controlled member, the former shaft being driven by the receiver rotor of the fine synchronizer, lost motion means connecting the receiver rotors, means responsive to said lost motion means when the lost motion exceeds a predetermined limited value for rendering the fine receiver rotor non-responsive to the fine transmitter rotor, and means also responsive to the lost motion means for actuating the valve to cause the high torque output shaft to be set into operation and maintained in operation for driving the controlled member and for limiting the speeds of the receiver rotors of both synchronizers until the controlled member is out of phase with the primary control member by an amount corresponding to less than one-half turn of the fine receiver rotor relative to the fine transmitter rotor.

10. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and electrical means for causing the receiver rotor to correspond in phase with the transmitter rotor subject to a lag of limited extent, a fine synchronizer comprising a transmitter rotor at the control station, a receiver rotor at the receiving station, and electrical means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, lost motion means connecting the fine and coarse synchronizer receiver rotors and permitting relative rotation of the fine synchronizer receiver rotor and the coarse synchronizer receiver rotor in either direction from a neutral or midway condition of the lost motion means limited in extent to a motion corresponding to less than a half turn of the fine receiver rotor, said lost motion means at either limit establishing a positive drive in one direction of rotation between the coarse and fine receiver rotors of the same ratio as that which is maintained between the transmitting rotors of the synchronizers, a power amplifier at the receiving station comprising a low power control shaft driven by the fine receiver rotor, a high torque output shaft for driving the controlled member, a high torque input shaft, opposed hydraulic slip drives between the high torque input shaft and the high torque output shaft, a valve for inversely controlling the positiveness of the drives, and differential gearing of limited output jointly operated by the low power control shaft and the high torque output shaft, means responsive to the lost motion means for rendering the fine receiver rotor non-responsive to the fine transmitter rotor when the lost motion is exhausted in either direction, and means also responsive to the lost motion means for actuating said valve independently of motion of the low power control shaft to set the high torque output shaft into operation and to maintain it in operation until the controlled member and the primary control member are out of phase by an amount not greater than the available lost motion.

11. In a remote control mechanism which includes a primary control member at a transmitting or control station and a controlled member at a receiving station which is required, when under the influence of the remote control mechanism, to be maintained in phase with the primary control member, subject to fine tolerances of error, in combination, a coarse synchronizer comprising a transmitter rotor at the control station, a receiver rotor at the receiving station, and electrical means for causing the receiver rotor to correspond in phase with the transmitter rotor subject to a lag of limited extent, a fine synchronizer comprising a transmitter rotor at the control station, a receiver rotor at the receiving station, and electrical means for causing the receiver rotor to correspond in phase with the transmitter rotor subject to a lag of limited extent, means for driving the coarse and fine transmitter rotors from the primary control member at speeds which bear a fixed relationship to one another, the latter at a speed substantially in excess of the former, lost motion means connecting the fine and coarse synchronizer receiver rotors and permitting relative rotation of the fine synchronizer receiver rotor and the coarse synchronizer receiver rotor in either direction from a neutral or midway condition of the lost motion means limited in extent to a motion corresponding to less than a half turn of the fine receiver rotor, said lost motion means at either limit establishing a positive drive in one direction of rotation between the coarse and fine receiver rotors of the same ratio as that which is maintained between the transmitting rotors of the synchronizers, a power amplifier at the receiving station comprising a low power control shaft driven by the fine receiver rotor, a high torque output shaft for driving the controlled member, a high torque input shaft, opposed hydraulic slip drives between the high torque input shaft and the high torque output shaft, a valve for inversely controlling the positiveness of the drives, and differential gearing of limited output jointly operated by the low power control shaft and the high torque output shaft, means for connecting the synchronizers to a source of electrical energy, a switch member operated by said lost motion means, a pair of electromagnets, a pair of circuits including the respective electromagnets and adapted to be selectively closed by the switch means in accordance with the direction in which the switch means is moved by the lost motion means, means responsive to energization of either of the electromagnets for rendering the fine receiver rotor nonresponsive to the fine transmitter rotor, means selectively responsive to the electromagnets for shifting the valve to a position to establish and maintain rotation of the high torque output shaft to operate the controlled member in one direction or the other according to the electromagnet which is energized until the controlled member is out of phase with the primary control member by an amount corresponding to less than a half turn of the fine receiver rotor relative to the fine transmitter rotor, said high torque output shaft, during such operation, acting through the fine receiver rotor and the lost motion connecting means positively to hold down the speed of the coarse receiver rotor and thereby to assure correspondence of operation of the coarse receiver rotor and the controlled member.

12. In a remote control mechanism which includes a primary control member at a transmitting or control station and a controlled member at a receiving station which is required, when under the influence of the remote control mechanism, to be maintained in phase with the primary control member subject to fine tolerances of error, in combination, a coarse synchronizer comprising a transmitter rotor at the control station, a receiver rotor at the receiving station, and means for causing the receiver rotor to correspond in phase with the transmitter rotor subject to a lag of limited extent, a fine synchronizer comprising a transmitter rotor at the control station, a receiver rotor at the receiving station, and means for causing the receiver rotor to correspond in phase with the transmitter rotor subject to a lag of limited extent, means for controlling the coarse and fine transmitter rotors from the primary control member, the former at the speed of the primary control member and the latter at a fixed multiple of that speed, differential means driven jointly by the two receiver rotors, and a power amplifier for driving the control member, said amplifier including a control member connected to be responsive to said differential means.

13. A remote control mechanism which includes a primary control member at a transmitting or control station and a controlled member at a receiving station which is required, when under the influence of the remote control mechanism, to be maintained in phase with the primary control member subject to fine tolerances of error, in combination, a pair of synchronizers each comprising rotors at the transmitting and receiving stations, respectively, and means for causing the receiving rotor of each synchronizer to seek and maintain phase correspondence with the transmitting rotor of the same synchronizer, means for driving the transmitting rotors from the primary control member at speeds bearing a fixed relation to one another, the rotor of the fine synchronizer at a speed considerably in excess of the speed of the rotor of the coarse synchronizer, differential means at the receiving station jointly operated by the receiving rotors of the two synchronizers, and means at the receiving station controlled by said differential means for driving the controlled member.

WILLIAM A. BLACK.